United States Patent [19]
Treuner et al.

[11] 3,886,149
[45] May 27, 1975

[54] AMINO SUBSTITUTED DITHIOCARBONYLTHIOACETYL CEPHALOSPORINS

[75] Inventors: Uwe D. Treuner, Regensburg; Hermann Breuer, Burgweinting, both of Germany

[73] Assignee: E. R. Squibb & Sons, Inc., Princeton, N.J.

[22] Filed: June 1, 1972

[21] Appl. No.: 258,686

[52] U.S. Cl. .......... 260/243 C; 260/242; 260/243 B; 260/247.1 R; 260/268 R; 260/293.85; 424/246
[51] Int. Cl. .............................................. C07d 99/24
[58] Field of Search .................... 260/243 C, 242 C

[56] References Cited
UNITED STATES PATENTS

| | | | |
|---|---|---|---|
| 3,431,259 | 3/1969 | Hattori et al. | 260/243 C |
| 3,573,298 | 3/1971 | Van Heyninger et al. | 260/243 C |
| 3,578,661 | 5/1971 | Havranek et al. | 260/243 C |

Primary Examiner—Nicholas S. Rizzo
Attorney, Agent, or Firm—Lawrence S. Levinson; Merle J. Smith

[57] ABSTRACT

Amino substituted dithiocarbonylthioacetylcephalosporins of the general formula

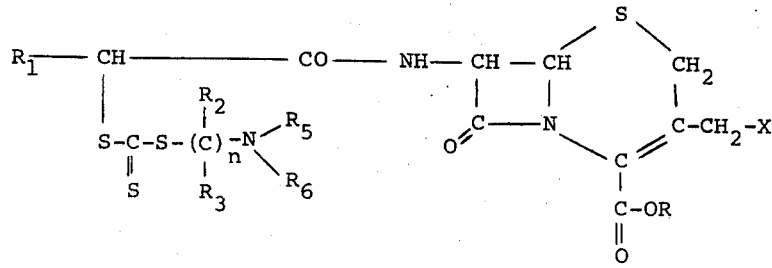

wherein R is hydrogen, lower alkyl, aralkyl, tri(lower alkyl)silyl, tri(lower alkyl)stannyl, a salt forming ion or the group

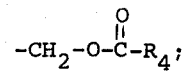

$R_1$ is hydrogen, lower alkyl, aralkyl, aryl or certain heterocyclic groups; $R_2$ and $R_3$ each is hydrogen or lower alkyl; $R_4$ is lower alkyl, aryl or aralkyl; $R_5$ is hydrogen or lower alkyl; $R_6$ is hydrogen, cycloalkyl, lower alkyl; or together $R_5$ and $R_6$ complete certain nitrogen heterocyclics; X is hydrogen, hydroxy, lower alkanoyloxy, aroyloxy, aralkanoyloxy, $SR_7$, $OR_7$, the radical of a nitrogen base, a quaternary ammonium radical, or together X and R represent a bond linking carbon and oxygen in a lactone ring; $R_7$ is lower alkyl; and $n$ is 1, 2, 3 or 4; are useful as antibacterial agents.

9 Claims, No Drawings

AMINO SUBSTITUTED DITHIOCARBONYLTHIOACETYL CEPHALOSPORINS

SUMMARY OF THE INVENTION

This invention relates to new aminodithiocarbonylthioacetylcephalosporins of the formula (I) 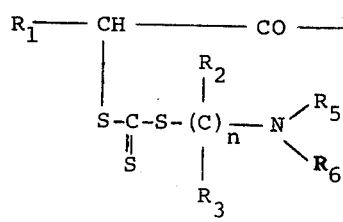 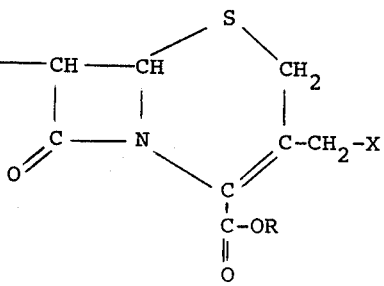

R represents hydrogen, lower alkyl, aralkyl, tri(lower alkyl)silyl, tri(lower alkyl)stannyl, a salt forming ion or the group

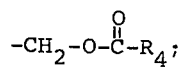

$R_1$ represents hydrogen, lower alkyl, aralkyl, aryl or certain heterocyclic groups; $R_2$ and $R_3$ each is hydrogen or lower alkyl; $R_4$ represents lower alkyl, aryl or aralkyl; $R_5$ is hydrogen or lower alkyl; $R_6$ is hydrogen, cycloalkyl, lower alkyl or $R_5$ and $R_6$ may also together complete certain nitrogen heterocyclics and $n$ is 1, 2, 3 or 4. X is hydrogen, hydroxy, lower alkanoyloxy, aroyloxy, aralkanoyloxy, $SR_7$, $OR_7$, the radical of a nitrogen base, a quaternary ammonium radical, or together X and R represent a bond linking carbon and oxygen in a lactone ring, $R_7$ is lower alkyl.

The preferred members within each group are as follows: R is hydrogen, alkali metal or

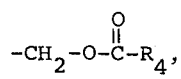

especially hydrogen, methyl, pivaloyloxy, sodium or potassium; $R_1$ is hydrogen, phenyl, thienyl, furyl or isothiazolyl, especially phenyl; $R_2$ and $R_3$ each is hydrogen or lower alkyl, especially each is hydrogen, and methyl or ethyl when one or both is lower alkyl; $R_4$ is lower alkyl, preferably methyl or t-butyl; $R_5$ and $R_6$ each is lower alkyl; n is 2; and X is preferably hydrogen or acetoxy.

DETAILED DESCRIPTION OF THE INVENTION

The various groups represented by the symbols have the meanings defined below and these definitions are retained throughout this specification.

The lower alkyl groups are straight or branched chain hydrocarbon radicals having one to eight carbons in the chain, for example, methyl, ethyl, propyl, isopropyl, butyl, isobutyl, t-butyl, amyl or the like.

The aryl groups are monocyclic carbocyclic aryl groups including simply substituted members. By way of illustration, this includes the phenyl ring and simply substituted phenyl containing one to three substituents $R_8$ (preferably only one), such as the halogens (chlorine and bromine being preferred), lower alkyl groups such as those defined above, lower alkoxy groups, (i.e., lower alkyl groups of the type defined above attached to an oxygen), hydroxy, carboxy and the like. In the case of the last two named substituents there is preferably only one, especially in the para position of the phenyl. Illustrative are phenyl, o-, m- and p-chlorophenyl, o-, m- and p-bromophenyl, 3,4-dichlorophenyl, 3,5-dibromophenyl, o-, m- and p-tolyl, p-methoxyphenyl, 3,4,5-trimethoxyphenyl, p-hydroxyphenyl, p-carboxyphenyl and the like.

The aralkyl groups include a monocyclic carbocyclic aryl group attached to a lower alkyl group, both as defined above. Illustrative are benzyl, o-, m- or p-chlorobenzyl, o-, m- or p-bromobenzyl, o-, m- or p-methylbenzyl, phenethyl, p-chlorophenethyl, 3,5-diethylbenzyl, 3,4,5-trichlorobenzyl and the like.

The cycloalkyl groups are the three to six membered alicyclics cyclopropyl, cyclobutyl, cyclopentyl and cyclohexyl of which the last two are preferred.

The lower alkanoyloxy, aroyloxy and aralkanoyloxy groups represented by X include the acyl group of acid esters. The lower alkanoyl radicals are the acyl radicals of lower fatty acids containing alkyl radicals of the type described above. The lower alkanoyloxy groups include, for example, acetoxy, propionyloxy, butyryloxy and the like. The aroyloxy groups are derived from monocyclic carbocyclic aryl groups of the kind described. Similarly the aralkanoyloxy groups consist of monocyclic carbocyclic aryl and alkanoyloxy radicals of the type described. X also represents the radical of an amine, e.g., an alkylamine like methylamine, ethylamine, dimethylamine, triethylamine, aralkylamine like dibenzylamine,(N,N'-dibenzylpyridinium,)pyridinium, 1-quinolinium, 1-picolinium, etc. X and R may also join together, as indicated above, to form a bond linking carbon and oxygen in a lactone ring.

The heterocyclic groups represented by $R_1$ are thienyl, furyl and isothiazolyl, as well as these heterocyclics with one or two of the substituents ($R_9$) halo, lower alkyl (particularly methyl and ethyl), lower alkoxy (particularly methoxy and ethoxy) or phenyl. $R_5$ and $R_6$ together with the nitrogen to which they are attached may also form a heterocyclic, i.e., piperidino, morpholino, thiamorpholino or piperazino and these too may bear one or two of the substituents ($R_9$) referred to above.

The salt forming ions represented by R and $R_2$ may be metal ions, e.g., aluminum, alkali metal ions such as sodium or potassium, alkaline earth metal ions such as calcium or magnesium, or an amine salt ion, of which a number are known for this purpose, for example, dibenzylamine, N,N-dibenzylethylenediamine, methylamine, triethylamine, procaine, N-ethylpiperidine, etc. The ester forming tri(lower alkyl)silyl and tri(lower alkyl)stannyl groups include, for example, trimethylsilyl, triethylsilyl, tri-n-butylstannyl and the like.

The new dithiocarbonylthioacetylcephalosporins of this invention are produced by reacting a 7-aminocephalosporanic acid compound of formula II [which includes 7-aminocephalosporanic acid (7-ACA), 7-amino-3-desacetoxycephalosporanic acid (7-ADCA) and other derivatives], or an activated derivative thereof, of the formula

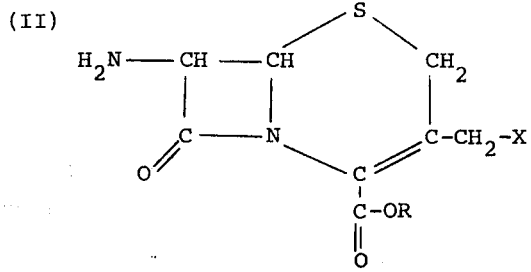

with an acid of the formula

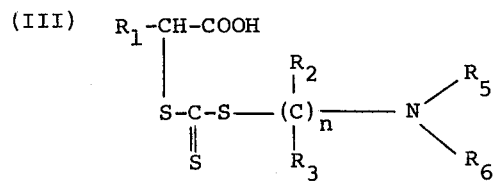

The activated derivatives refered to include, for example, the reaction product with an anhydride forming reagent such as ethylchloroformate, benzoyl chloride, pivaloyl chloride, etc., or with bis-imidazolecarbonyl, dicyclohexylcarbodiimide, p-nitrophenol or the like.

The reaction between the 7-aminocephalosporanic acid compound and the acid may be effected, for example, by dissolving or suspending the latter in an inert organic solvent such as chloroform, methylene chloride, dioxane, benzene or the like, and adding, at about room temperature or below, about an equimolar amount of an anhydride forming reagent, e.g., ethyl chloroformate, benzoylchloride or the like, or other activating compound such as dicyclohexylcarbodiimide, along with a salt forming organic base, such as triethylamine, pyridine or the like, followed, after an interval, by the addition of the 7-aminocephalosporanic acid compound. The produce of the reaction is then isolated by conventional procedures, e.g., by concentration or evaporation of the solvent.

When R is the acyloxymethyl group

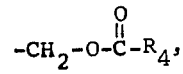
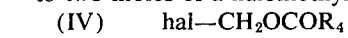

this group may be introduced into the 7-aminocephalosporanic acid moiety prior to the reaction with the acid or the activated derivative by treatment with one to two moles of a halomethyl ester of the formula (IV)   hal—$CH_2OCOR_4$ wherein hal is halogen, preferably chlorine or bromine, in an inert organic solvent such as dimethylformamide, acetone, dioxane, benzene or the like, at about ambient temperature or below.

As an alternative, a product of formula I may be produced by reacting a salt, e.g., an alkali metal salt of a compound of the formula (V)
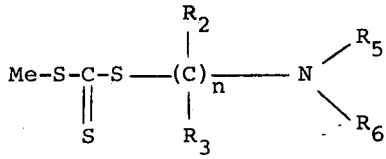

with a compound of the formula (VI)
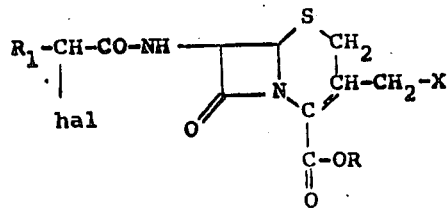

or derivative thereof, in a solvent such as dimethylformamide. Me represents a metal, hal is halogen, preferably chlorine or bromine and all the other symbols are the same as above.

The acid of formula III and the salt of formula V may be produced according to the following general method:

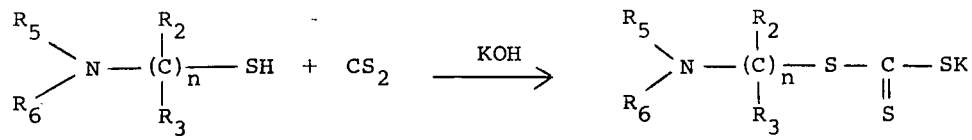

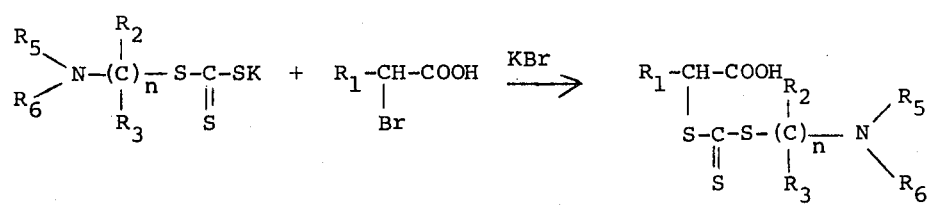

See Bonner, Jour. Org. Chem. 33, 1831 (1968). See also U.S. Pat. No. 3,264,337, Aug. 2, 1966.

Further process details are also provided in the illustrative examples.

Certain of the compounds of this invention may exist in different optically active forms. The various stereoisomeric forms as well as the racemic mixtures are within the scope of the invention.

The compounds of this invention have a broad spectrum of antibacterial activity against both gram positive and gram negative organisms such as *Staphylococcus aureus, Salmonella schottmuelleri, Pseudomonas aeruginosa, Proteus vulgaris, Escherichia coli* and *Streptococcus pyogenes*. They may be used an antibacterial agents in a prophylactic manner, e.g., in cleaning or disinfecting compositions, or otherwise to combat infections due to organisms such as those named above, and in general may be utilized in a manner similar to cephalothin and other cephalosporins. For example, a compound of formula I or a physiologically acceptable salt thereof may be used in various animal species in an amount of about 1 to 200 mg./kg., daily, orally or parenterally, in single or two to four divided doses to treat infections of bacterial origin, e.g., 5.0 mg./kg. in mice.

Oral forms give prompt high blood levels which are maintained for relatively long periods.

Up to about 600 mg. of a compound of a formula I or a physiologically acceptable salt thereof may be incorporated in an oral dosage form such as tablets, capsules or elixirs or in an injectable form in a sterile aqueous vehicle prepared according to conventional pharmaceutical practice.

They may also be used in cleaning or disinfecting compositions, e.g., for cleaning barns or dairy equipment, at a concentration of about 0.01 to 1% by weight of such compounds admixed with, suspended or dissolved in conventional inert dry or aqueous carriers for application by washing or spraying. They are also useful as nutritional supplements in animal feeds.

The following examples are illustrative of the invention. All temperatures are on the centigrade scale. Additional variations may be produced in the same manner by appropriate substitution in the starting material.

EXAMPLE 1

DL-[[[[2-(Dimethylamino)ethyl]thio]thiocarbonyl]thio]-phenylacetic acid 2.15 g. (10mM) of α-bromophenylacetic acid and 2.20 g. (10mM) of trithiocarbonic acid, 5-dimethylaminoethyl ester, potassium salt, are stirred for 15 minutes in 20 ml. of dimethylformamide. The potassium bromide precipitate is removed by filtration under suction and the dimethylformamide solution is concentrated at 35°–40° by means of a vacuum oil pump. The addition of a little water to the residue induces crystallization. Upon recrystallization from water, there is obtained an 85% yield of DL-[[[[2-(dimethylamino)ethyl]thio]thiocarbonyl]thio]-phenylacetic acid as yellow crystals, m.p. 102°–104°.

EXAMPLE 2

7-DL-2-[[[[2-(Dimethylamino)ethyl]thio]thiocarbonyl]thio]-2-phenylacetamidocephalosporanic acid 4.70 g. (10mM) of 7-α-(bromoacetamido)cephalosporanic acid and 2.20 g. (10mM) of trithiocarbonic acid, 5-dimethylaminoethyl ester, potassium salt are stirred for 30 minutes at room temperature in 30 ml. of absolute dimethylformamide. The solvent is then distilled off by means of a vacuum oil pump. The residue is treated with ether and a yellow solid is obtained. After removing the solid and washing it with ether, the solid is then treated with water producing a viscous mass which is triturated with ether to obtain a yellow crystalline solid, 7-DL-2-[[[[2-(dimethylamino)ethyl]thio]thiocarbonyl]thio]-2-phenylacetamidocephalosporanic acid, m.p. 90° (dec.).

The following additional products having the formula (c) in the table are obtained by the procedure of Example 2 by substituting for the 7-α-(bromophenylacetamido)cephalosporanic acid, the starting material (a), and for the trithiocarbonic acid ester salt, the starting material (b) with the substituents indicated in the table:

TABLE

| Example | (a) R | $R_1$ | (b) $R_2$ | $R_3$ | (c) $R_5$ | $R_6$ | n | X |
|---|---|---|---|---|---|---|---|---|
| 2 | K | H | H | H | $C_2H_5$ | $C_2H_5$ | 1 | H |
| 3 | $C_2H_5$ | $CH_3$ | H | H | H | $CH_3$ | 1 | OH |
| 4 | Na | $C_3H_7$ | H | H | $CH_3$ | $CH_3$ | 1 | pyridinium |
| 5 | —CH$_2$OC(O)—CH(CH$_3$)$_2$ | $C_6H_5CH_2$ | H | H | $CH_3$ | $CH_3$ | 1 | $OCOCH_3$ |
| 6 | —CH$_2$OC(O)—C$_6$H$_5$ | 4—ClC$_6$H$_4$ | H | H | $C_2H_5$ | $C_2H_5$ | 1 | $OCOCH_3$ |
| 7 | K | 3,4—(CH$_3$O)$_2$C$_6$H$_3$ | $CH_3$ | H | $CH_3$ | $CH_3$ | 1 | H |
| 8 | H | $C_6H_5$ | H | H | $C_2H_5$ | $C_2H_5$ | 2 | H |

TABLE — Continued $R_1-CH(Br)-CO-NH-[\beta\text{-lactam}]-CH_2-X + K-S-C(=S)-S-C(R_2)(R_3)-(C)_n-N(R_5)(R_6) \rightarrow R_1-CH(S-C(=S)-S-C(R_2)(R_3)-(C)_n-N(R_5)(R_6))-CO-NH-[\text{cephem}]-CH_2X$, $-COOR$

| | (a) | | (b) | | | | (c) | |
|---|---|---|---|---|---|---|---|---|
| Example | R | R₁ | R₂ | R₃ | R₅ | R₆ | n | X |
| 9 | H | C₆H₅ | H | H | \multicolumn{2}{c}{piperidino (N,H)} | 2 | OCOCH₃ |
| 10 | H | H | H | H | \multicolumn{2}{c}{morpholino (N,H,O)} | 2 | OCOCH₃ |
| 11 | H | C₆H₅ | CH₃ (CH—CH₂)ₙ | CH₃ | CH₃ | CH₃ | 1 | H |
| 12 | H | 3,4,5-(CH₃O)₃C₆H₂ | H | H | H | cyclopentyl (H) | 2 | OCOCH₃ |
| 13 | Na | 4-CH₃C₆H₄ | H | H | H | cyclohexyl (H) | 1 | OCOCH₃ |
| 14 | lactone (+X) | 3,4-(Br)₂C₆H₃CH₂ | H | H | CH₃ | CH₃ | 1 | lactone (+R) |
| 15 | Na | 2,4-(Cl)₂C₂H₃ | H | H | \multicolumn{2}{c}{N-methylpiperazino (N,H,N-CH₃)} | 1 | OCOCH₃ |
| 16 | K | isothiazolyl | H | H | C₂H₅ | C₂H₅ | 1 | OCOCH₃ |
| 17 | H | thienyl | H | H | CH₃ | CH₃ | 1 | OCOCH₃ |
| 18 | C₆H₅CH₂ | 5-CH₃-furyl | H | CH₃ | C₂H₅ | C₂H₅ | 1 | OCOCH₂C₆H₅ |
| 19 | CH₂OC(O)C(CH₃)₃ | C₆H₅ | H (C—CH₂)ₙ CH₃ | H | CH₃ | CH₃ | 3 | H |
| 20 | H | C₆H₅ | CH₃ | CH₃ | CH₃ | CH₃ | 1 | OCOCH₃ |
| 21 | H | furyl | H | H | H | CH₃ | 4 | H |
| 22 | CH₂O-C(O)-C(CH₃)₃ | C₆H₅ | CH₃ | CH₃ | CH₃ | cyclohexyl (H) | 1 | OOC—C₆H₅ |
| 23 | H | C₆H₅ | H | H | CH₃ | CH₃ | 1 | SC₂H₅ |
| 24 | Na | C₆H₅ | H | H | H | C₂H₅ | 2 | H |
| 25 | CH₂O-C(O)-C(CH₃)₃ | C₆H₅ | H | CH₃ | CH₃ | CH₃ | 1 | SCH₃ |
| 26 | H | C₆H₅ | H | H | CH₃ | CH₃ | 1 | H |
| 27 | H | C₆H₅ | H | H | C₂H₅ | C₂H₅ | 1 | H |
| 28 | H | C₆H₅ | H | H | C₂H₅ | C₂H₅ | 1 | OCOCH₃ |
| 29 | H | C₆H₅ | H | H | CH₃ | CH₃ | 1 | OC₂H₅ |
| 30 | Si(CH₃)₃ | C₆H₅ | H | H | CH₃ | CH₃ | 1 | H |
| 31 | Sn(n-butyl)₃ | C₆H₅ | H | H | C₂H₅ | C₂H₅ | 1 | H |

What is claimed is:

1. A compound of the formula

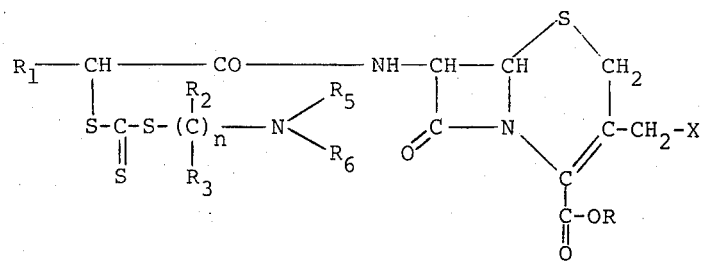

wherein R is hydrogen, lower alkyl, alkali metal, trimethylsilyl or

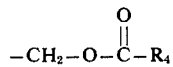

$R_1$ is phenyl; $R_2$, $R_3$ and $R_5$ each is hydrogen or lower alkyl; $R_4$ is lower alkyl, phenyl or phenyl-lower alkyl; $R_6$ is lower alkyl or $R_5$ and $R_6$ together complete one of the unsubstituted heterocyclics piperidino, morpholino, thiamorpholino or piperazino; X is hydrogen, hydroxy or lower alkanoyloxy; and $n$ is 1, 2, 3 or 4.

2. A compound as in claim 1 wherein $R_1$ is phenyl, R, $R_2$, $R_3$ and X each is hydrogen, $R_5$ and $R_6$ each is lower alkyl.

3. A compound as in claim 2 wherein each lower alkyl group is methyl and $n$ is 1.

4. A compound as in claim 1 wherein $R_1$ is phenyl, R, $R_2$ and $R_3$ each is hydrogen, $R_5$ and $R_6$ each is lower alkyl and X is acetoxy.

5. A compound as in claim 4 wherein each lower alkyl group is methyl and $n$ is 2.

6. A compound as in claim 4 wherein each lower alkyl group is methyl and $n$ is 1.

7. A compound as in claim 2 wherein each lower alkyl group is ethyl and $n$ is 1.

8. A compound as in claim 4 wherein each lower alkyl group is ethyl and $n$ is 1.

9. A compound as in claim 1 wherein R is hydrogen, alkali metal or

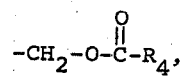

$R_1$ is phenyl, $R_2$, $R_3$, $R_4$, $R_5$ and $R_6$ each is lower alkyl, $n$ is 2 and X is hydrogen or acetoxy.

* * * * *